US006293304B1

(12) United States Patent
Broberg

(10) Patent No.: US 6,293,304 B1
(45) Date of Patent: Sep. 25, 2001

(54) FUEL VALVE

(75) Inventor: James E. Broberg, Crystal Lake, IL (US)

(73) Assignee: Du-Bro Products, Inc., Wauconda, IL (US)

( * ) Notice: Subject to any disclaimer, the term of this patent is extended or adjusted under 35 U.S.C. 154(b) by 0 days.

(21) Appl. No.: 09/660,794

(22) Filed: Nov. 27, 2000

(51) Int. Cl.[7] .................................................... F16K 24/04

(52) U.S. Cl. ........................................... 137/588; 137/590

(58) Field of Search ..................................... 137/588, 590

(56) References Cited

U.S. PATENT DOCUMENTS

| | | | | |
|---|---|---|---|---|
| 633,913 | * | 9/1899 | Silverthorn | 137/588 |
| 657,106 | * | 9/1900 | Handy | 137/588 |
| 928,813 | * | 7/1909 | Spikes | 137/588 |
| 1,192,134 | * | 7/1916 | Stevens | 137/588 X |
| 1,288,356 | * | 12/1918 | Woods | 137/588 X |
| 1,993,006 | * | 3/1935 | Hermans | 137/588 X |
| 2,070,921 | * | 2/1937 | Ramirez | 137/588 X |
| 2,210,098 | * | 8/1940 | Ravenscroft | 137/588 X |
| 2,239,275 | * | 4/1941 | Schwab | 137/588 X |
| 2,426,733 | * | 9/1947 | Gee | 137/588 X |
| 2,527,849 | * | 10/1950 | Ranney | 137/588 X |
| 3,058,719 | * | 10/1962 | Beebee | 137/588 X |
| 3,205,923 | * | 9/1965 | Wilson | 137/588 X |
| 3,722,538 | * | 3/1973 | Gezari | 137/588 |
| 3,923,203 | * | 12/1975 | Anderson, Jr. | 137/588 X |
| 4,080,989 | * | 3/1978 | Chapelsky et al. | 137/588 |
| 4,508,236 | * | 4/1985 | Keilman et al. | 137/588 X |

* cited by examiner

*Primary Examiner*—John Rivell
(74) *Attorney, Agent, or Firm*—Niro, Scavone, Haller & Niro

(57) ABSTRACT

A valve includes a fuel passageway and a vent passageway in a single unitary fitting. The valve is externally threaded to be threaded into a hole made in the cap of a fuel container. The fuel passageway includes nipples for attachment of conduits. The vent passageway includes an O-ring to receive a nozzle connected to the fuel passageway and used for conducting fuel from the container to a fuel tank.

4 Claims, 5 Drawing Sheets

FUEL VALVE

BACKGROUND OF THE INVENTION

The present invention relates to a novel fuel valve for use in connection with the fueling of hobby equipment such as gas powered airplanes, cars, boats and other equipment.

SUMMARY OF THE INVENTION

In order to fuel hobby type gas powered equipment, it is typically required to pump fuel from a plastic container containing premixed fuel through a hand pump to the equipment. Fuel valves are often used to connect the necessary hoses and other equipment. Typically, current fuel valve systems require that two holes or openings be made in the container. A first hole is made in the cap of the fuel container to connect the fuel intake and feed lines to the pump and fuel nozzle. A second hole is also made to provide a vent hole and to accommodate a nozzle seal.

The present invention improves upon the prior art by the use of a novel fuel valve system which requires the creation of a single hole in the cap. The invention includes a base in which two passageways are located. One passageway serves as a complete fuel line and the second serves as both a vent and nozzle retention port.

DESCRIPTION OF THE DRAWINGS

These and other features, objects and advantages of the present invention will become apparent from the following description and drawings wherein like reference numerals represent like elements in several views, and in which.

DESCRIPTION OF THE PREFERRED EMBODIMENT

Set forth below is a description of what are currently believed to be the preferred embodiments or best examples of the invention claimed. Future and present alternatives and modifications to the preferred embodiments are contemplated. Any alternates or modifications in which insubstantial changes in function, in purpose, in structure or in result are intended to be covered by the claims of this patent.

Figure 1:
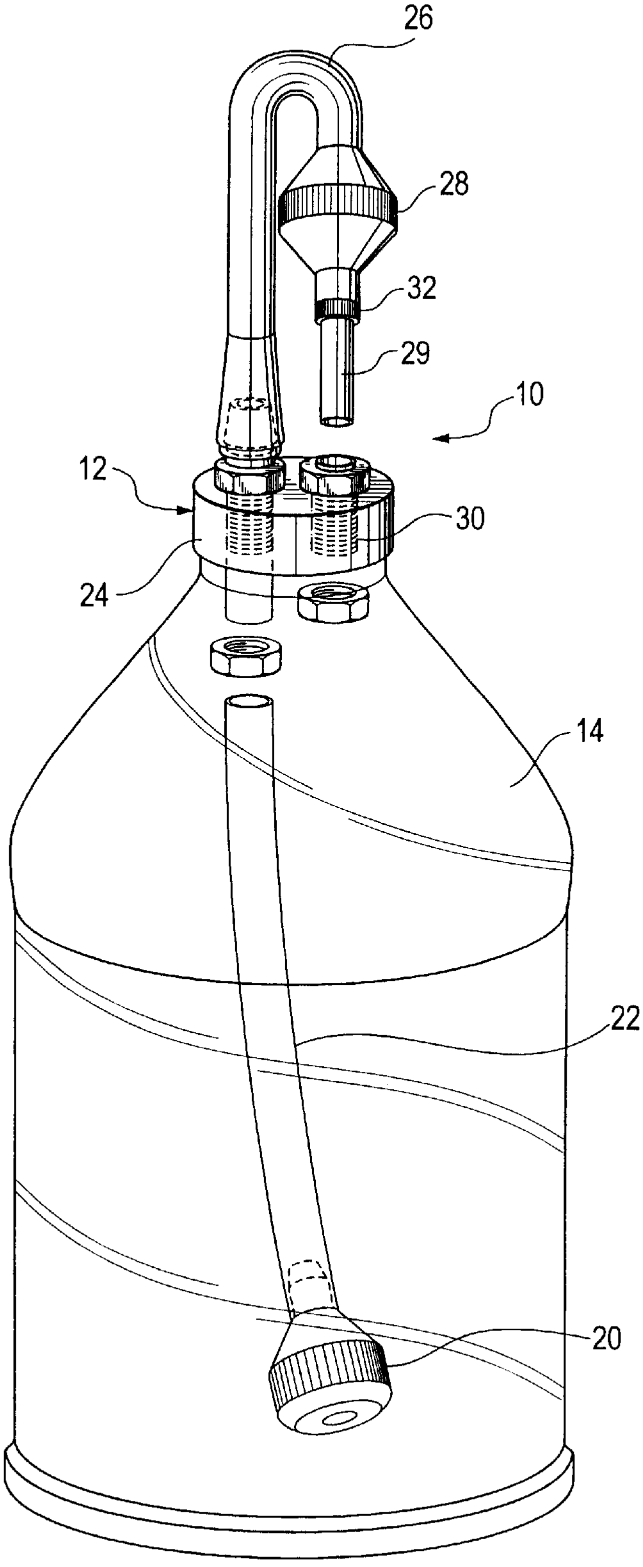
Fig. 1 PRIOR ART
FIG. 1 is a perspective view of prior art fuel valve systems.

As shown in FIG. 1, a typical prior art fuel valve system 10 is mounted to the cap 12 of fuel container 14. The prior art system includes filter 20, intake line 22 which is connected to first valve 24 which is in communication with feed line 26, pump 28 and nozzle 29. To provide venting, additional valve 30 is secured to and penetrates cap 12. Valve 30 is also configured to receive nozzle 29 for storage and an O-ring 32 on nozzle 29 acts as a seal.

As shown, the prior art system requires two holes must be made in the cap to assemble the system. This increases the potential for leaks of flammable liquids and requires additional assembly. In addition, the external O-ring on the nozzle is subject to wear and cracking which inhibits a proper seal from being formed.

Figure 2A:
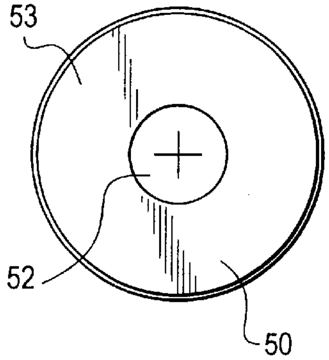
FIG. 2A is a bottom view of a cap for use with the embodiment shown in FIG. 2.
Figure 2:
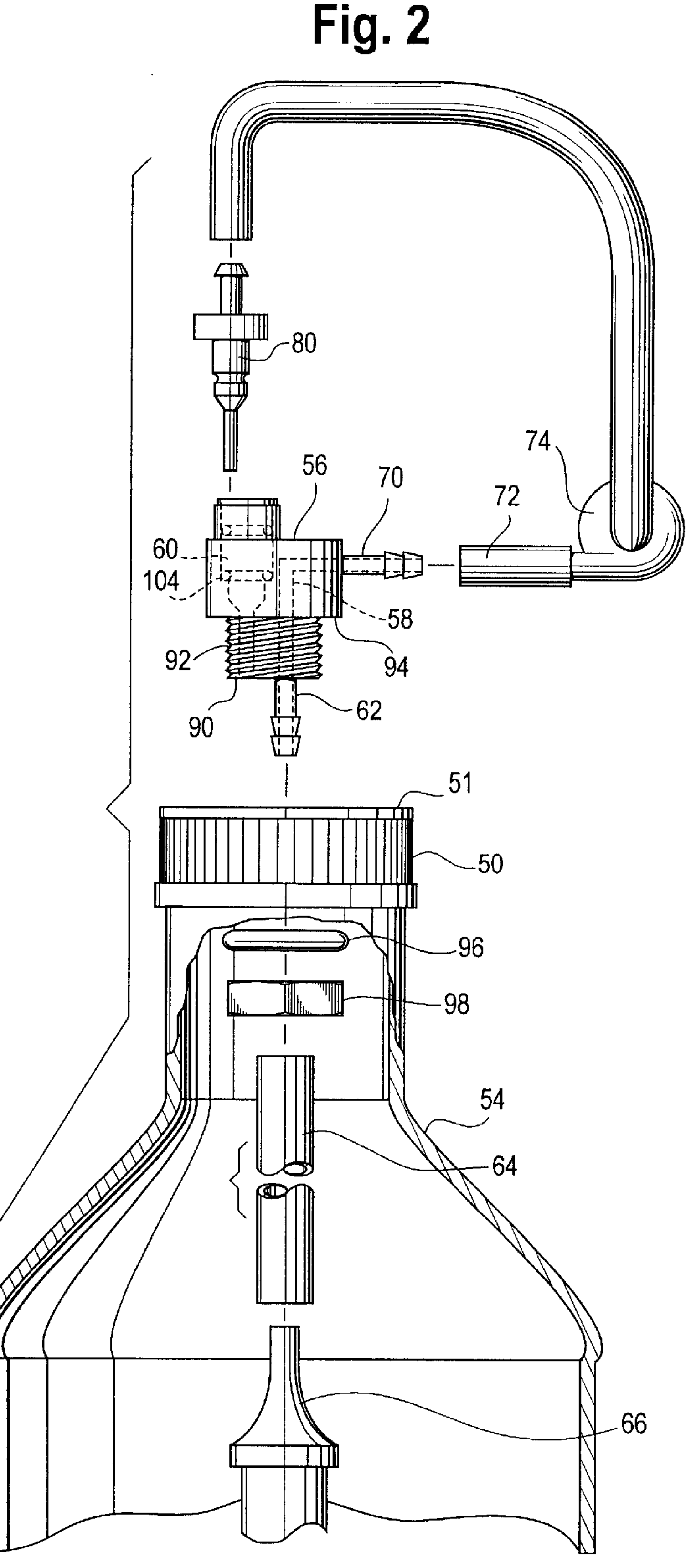
FIG. 2 is a perspective view of the present invention.
Figure 3:
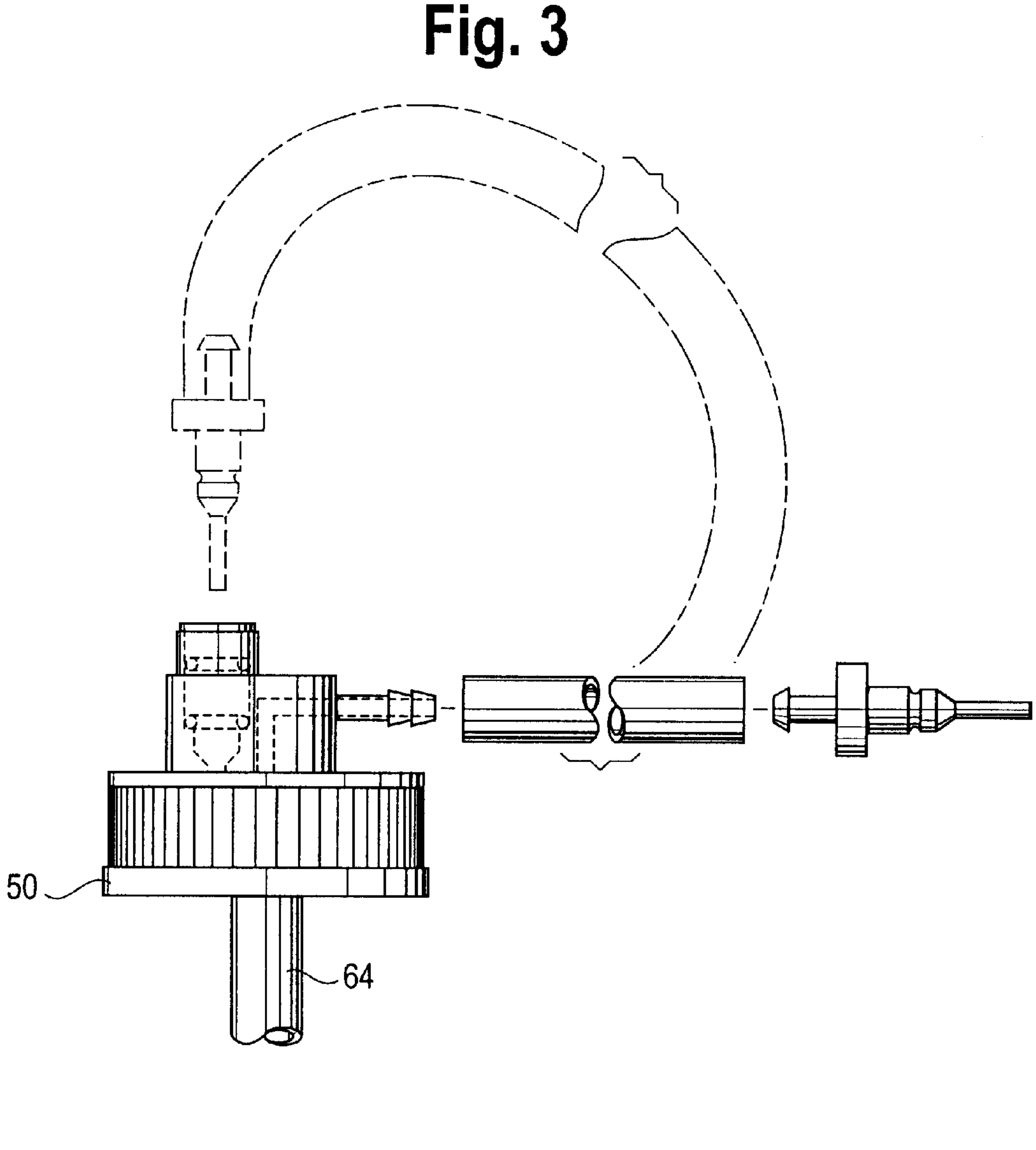
FIG. 3 is a another perspective view showing the fuel valve seated on a cap of a fuel container.
Figure 4:
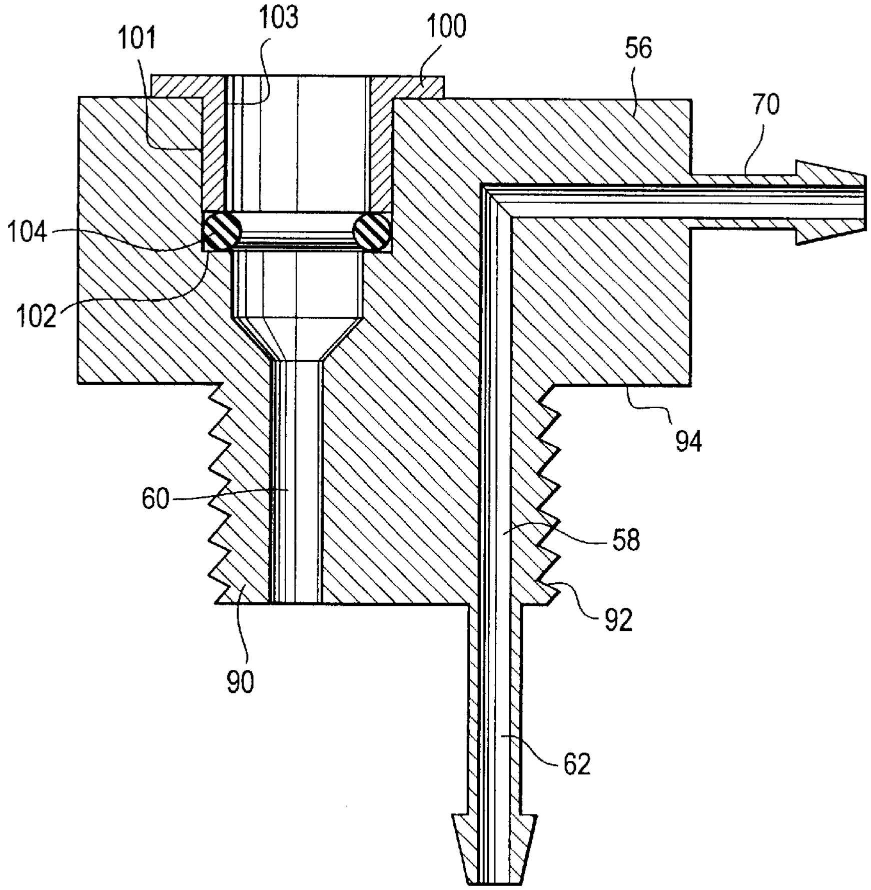
FIG. 4 is a partial cross-sectional view of the fuel valve.
Figure 5:
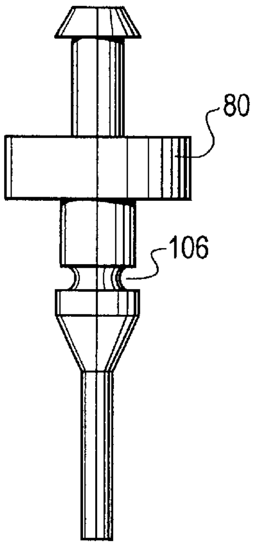
FIG. 5 is a front view of the fuel nozzle.

As shown in FIGS. 2–3, the present invention requires that a single hole 52 be made in cap 50 which is attached to a fuel container 54. The present invention includes valve 56 containing a fuel passageway 58 and venting passageway or port 60 as shown in FIG. 4.

Fuel passageway 58 is in communication with a nipple 62 which allows a fuel line 64 and filter 66 to be attached to valve 56. A second nipple 70 which is also in communication with passageway 58 permits fuel feed line 72, pump 74, and nozzle 80 to be connected together as shown in FIG. 2. This structure forms a complete system that allows fuel to be drawn out of container 54 to fuel a piece of equipment by the insertion of nozzle 80 into the equipment or a feed tube in communication with the equipment fuel tank.

A stem 90 having external threads 92 is provided on valve 56 as well as lower surface 94. O-ring 96 and fastener 98 are also provided.

Valve 56, which may be made of plastic, may also include metal insert 100 which is press-fitted into chamber 101 having boss or lower seat 102. An O-ring 104 is seated on boss 102.

In use, a user first drills a single hole 52 in cap 50. The size of hole 52 should be slightly larger than stem 90. Stem 90 is then inserted through hole 52 until the stepped configuration between stem 90 and surface 94 results in surface 94 acting as a stop by engaging top surface 51 of cap 50. O-ring 96 is then placed over stem 90 and fastener 98 is used to compress O-ring 96 against cap surface 53 to secure valve 56 to cap 50. Hose 64 and attached filter are attached to nipple 62, and afterwards, cap 50 may then be secured to container 54.

Next, hose 72, pump, and attached nozzle 80 are secured to nipple 70. This forms a complete fuel line in which operation of the pump delivers fuel to nozzle 80 for dispensing from the nozzle to the tank fill line.

Figure 6:
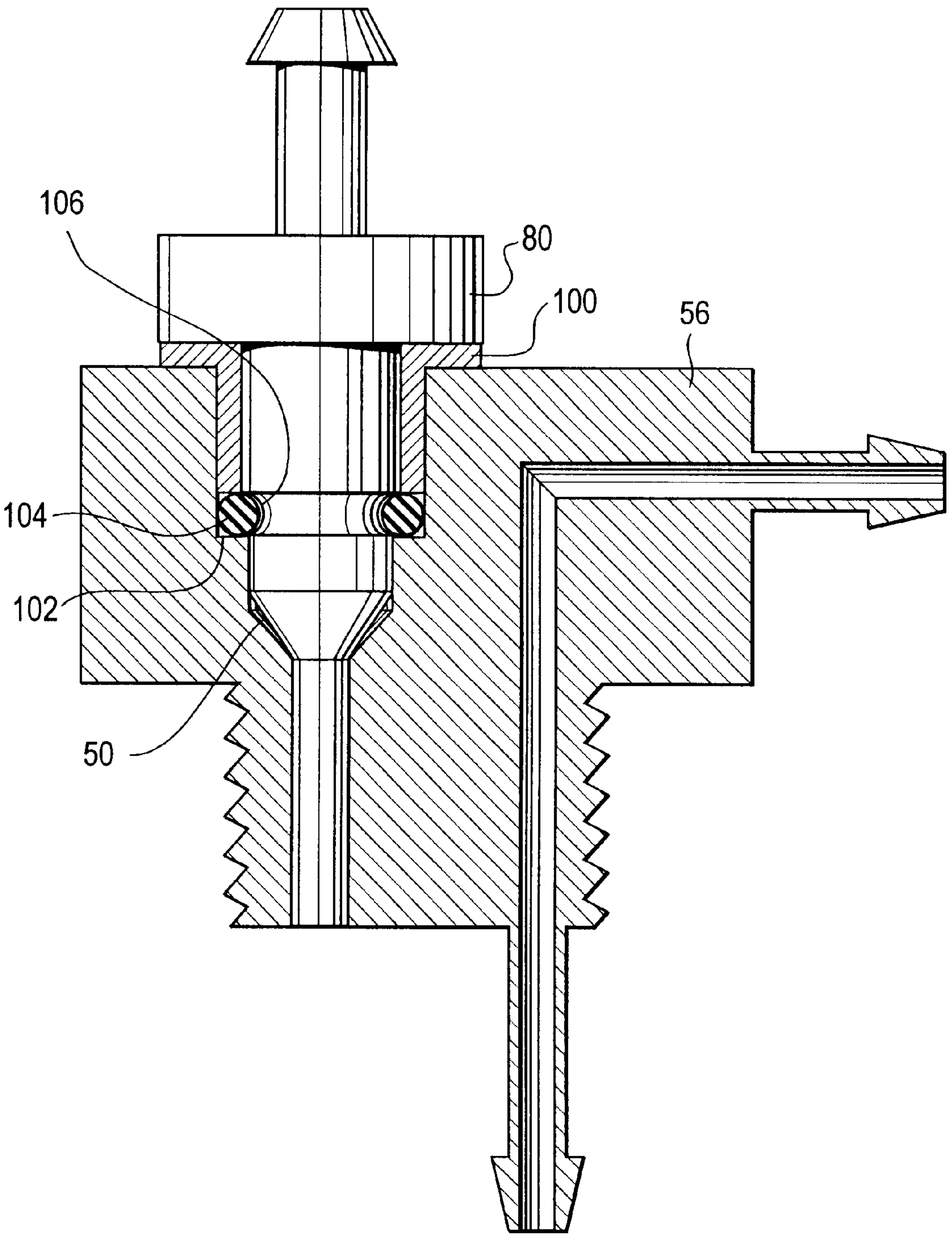
FIG. 6 is a cross-sectional view showing the nozzle seated within the valve.

During the dispensing of fuel, passageway 60 acts as a vent. Once fueling is completed, passageway 60 acts as a port in which nozzle 80 may be seated as shown in FIG. 6 for storage and to seal passageway 60. To accomplish this, metal insert 100 is press-fitted into enlarged aperture or chamber 101 after O-ring 104 has been inserted and is resting upon boss 102. The use of insert 100 in this manner provides an economical way to manufacture the valve with an internal O-ring and also assists in preventing wear from contact with metal nozzle 80. The aperture 103 defined by insert 100 is sized to form a close fit with nozzle 80 as is the remainder of passageway 60 of valve 56 as is shown in FIG. 6. O-ring 104 forms a snap fit with annular groove 106 on nozzle 80. This seals off passageway 60 and also releasably retains the nozzle valve 56 for storage purposes.

While the preferred embodiments of the present invention have been illustrated and described, it will be understood by those of ordinary skill in the art that changes and other modifications can be made without departing from the invention in its broader aspects. Various features of the present invention are set forth in the following claims.

What is claimed is:

1. A fuel valve for insertion through a single hole in a fuel cap and seating thereon comprising:

a valve body having first and second passageways which pass through a downwardly extending stem, said stem having external threads which coact with a threaded fastener to secure said valve body to said cap;

nipples for receiving tubing extending from said first passageway;

said second passageway sized to releasably receive a nozzle; and an O-ring seated in said second passageway, said O-ring cooperates with the nozzle to seal said second passageway.

2. The device of claim 1, wherein said valve body includes an enlarged aperture in communication with said second passageway, said aperture terminating in a boss on which said O-rings seats, and a hollow insert sized to press-fit into said aperture to secure said O-ring inside said valve.

3. The device of claim 2 wherein said insert includes an aperture sized to receive a portion of a nozzle.

4. The device of claim 2 wherein said insert is made of metal.

* * * * *